UNITED STATES PATENT OFFICE.

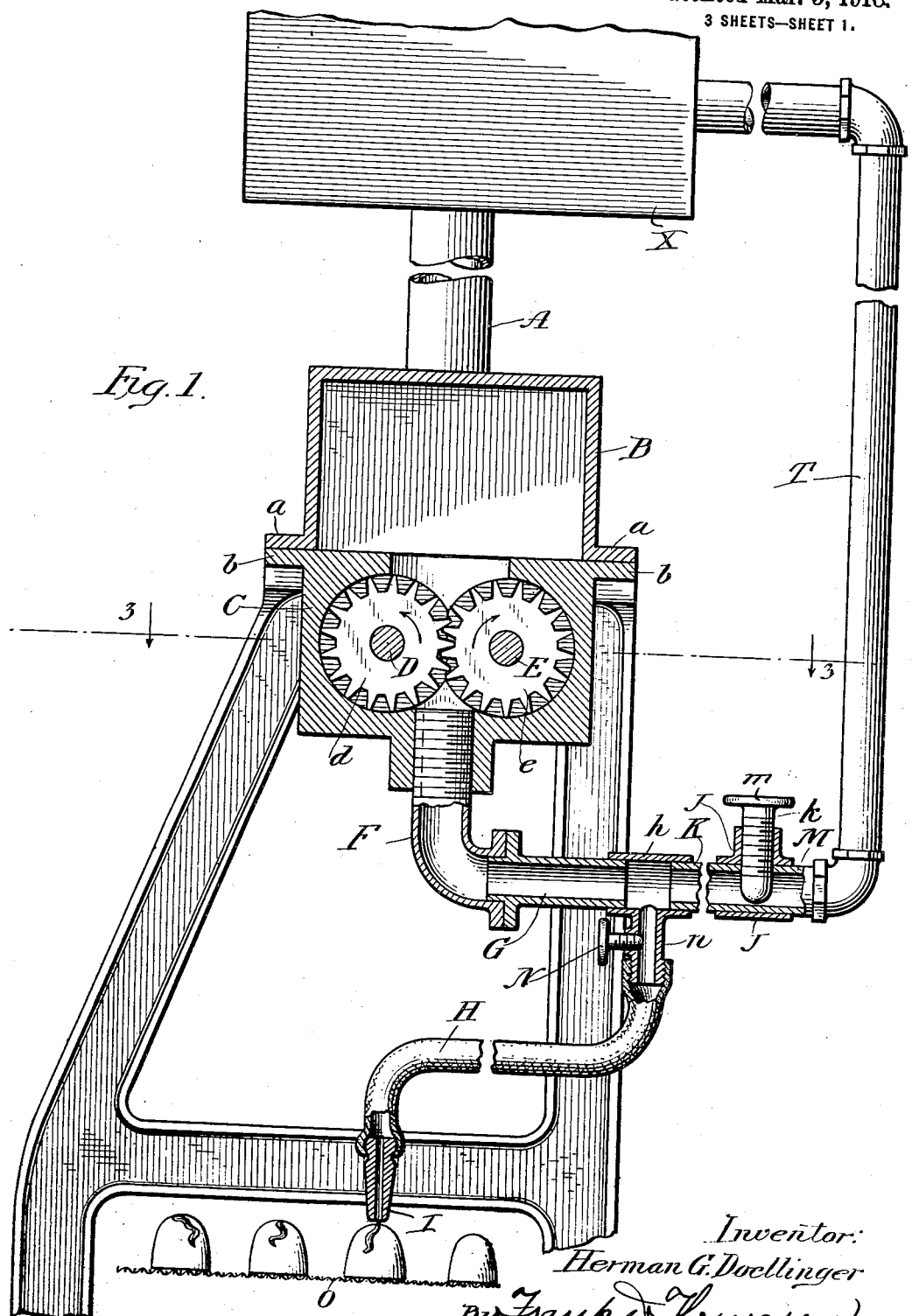

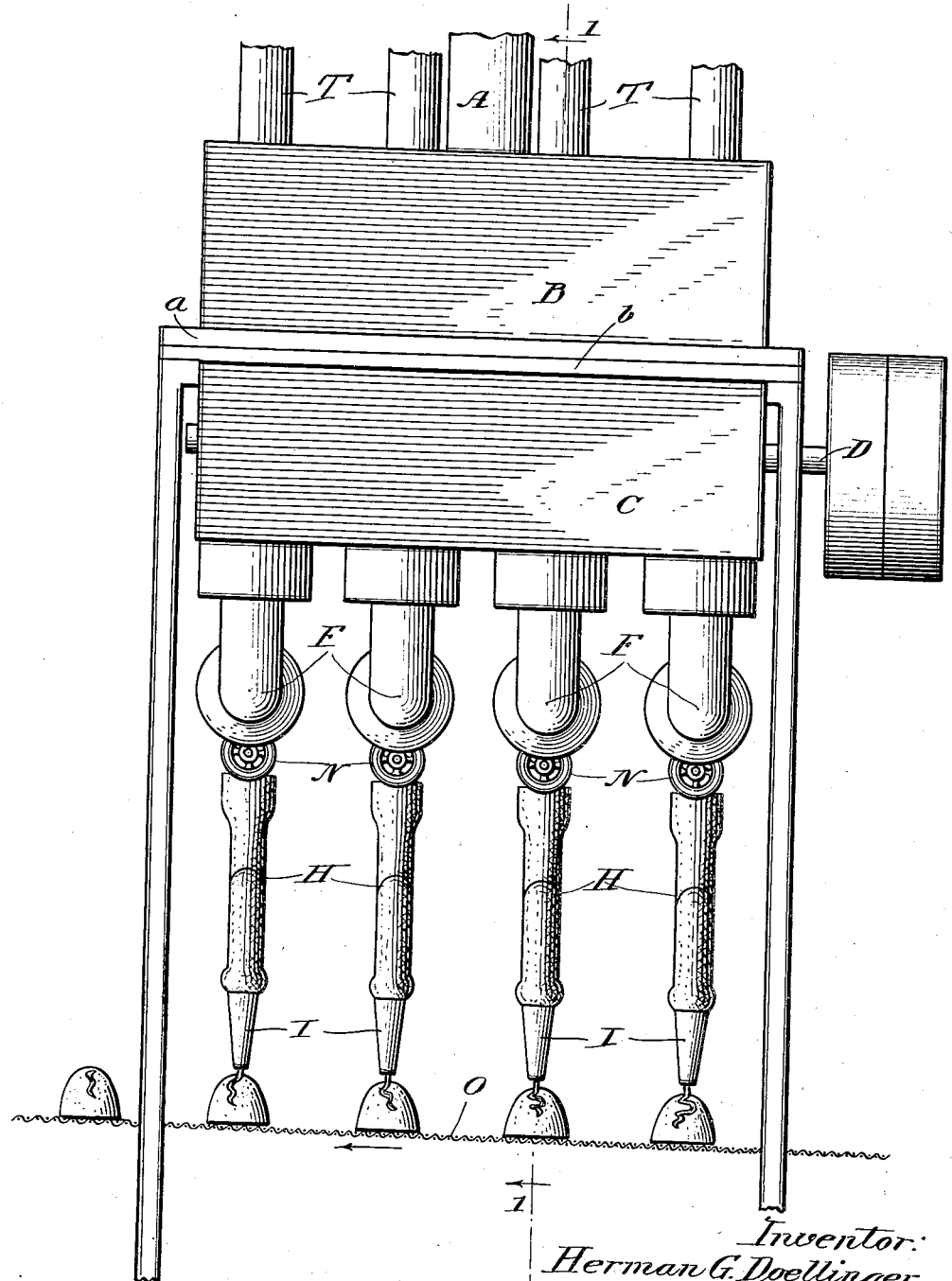

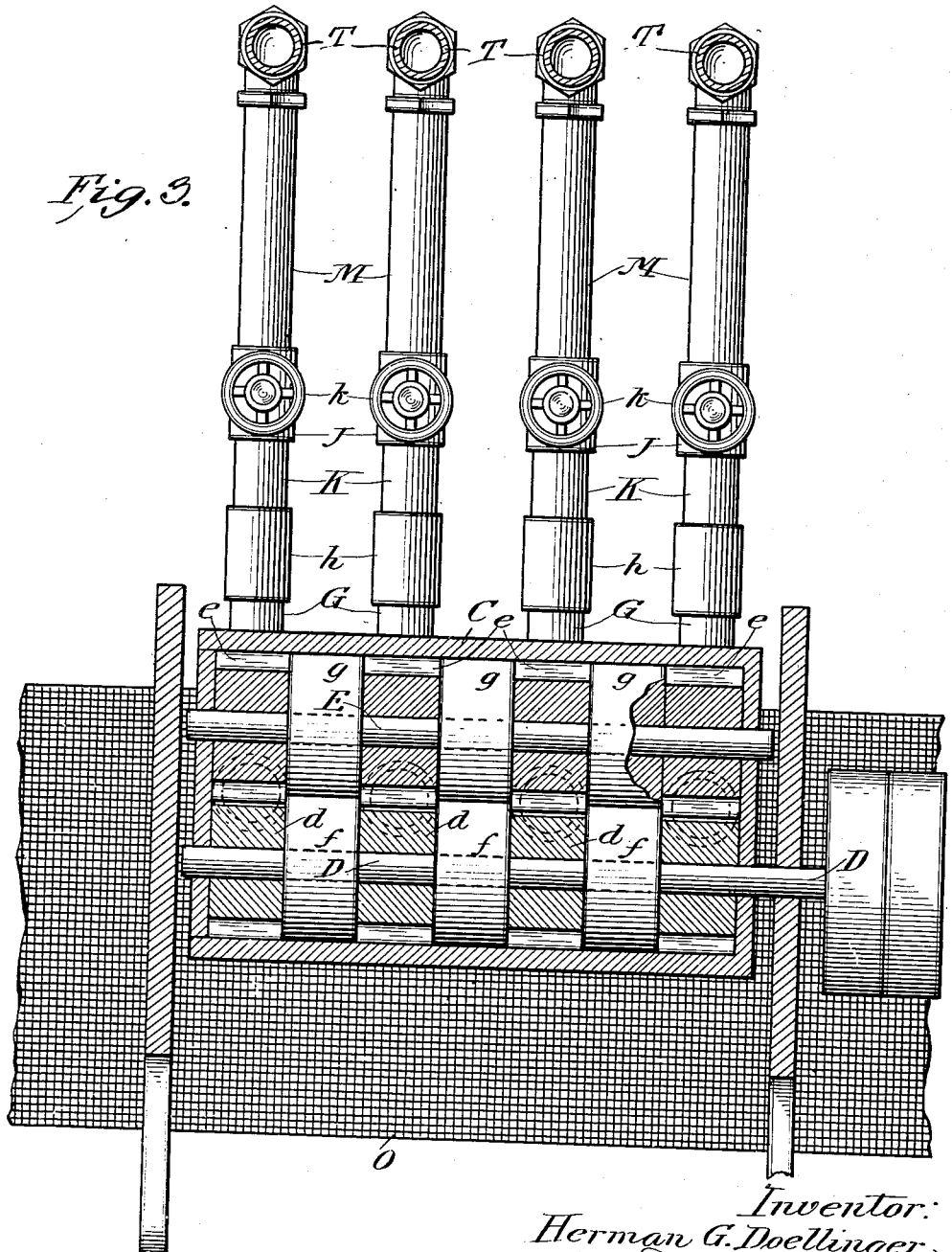

HERMAN G. DOELLINGER, OF DAVENPORT, IOWA.

MACHINE FOR DECORATING CONFECTIONS.

1,258,322.  Specification of Letters Patent.  Patented Mar. 5, 1918.

Application filed April 9, 1917. Serial No. 160,673.

*To all whom it may concern:*

Be it known that I, HERMAN G. DOELLINGER, a citizen of the United States, residing at Davenport, in the county of Scott and State of Iowa, have invented new and useful Improvements in Machines for Decorating Confections, of which the following is a full, clear, and exact description.

My invention relates to machines for decorating confections, and particularly to the ornamenting or marking chocolate creams and bon bons by the process known as stringing.

Heretofore this has been done by dipping the fingers into liquid chocolate or coating and trailing a string of the same as it flows from the finger tips over the tops of the chocolate creams or bon bons so as to make a suitable design or marking thereon, or this "stringing" as it is called, was done by machine. The hand work of this character is very much slower and more expensive than machine work, although permitting of a greater variety of ornamentation; the machine work is faster but limited to one design.

The object of my invention is to enable the stringing to be done by a combination of the machine and hand very much cheaper than it can be done by the hand alone and without affecting the variety of designs or markings the operator can do. This I accomplish by the means hereinafter fully described and as particularly pointed out in the claims.

In the drawings:

Figure 1 shows a vertical transverse section taken on dotted line 1—1, Fig. 2.

Fig. 2 shows a plan view of the same with the hopper removed.

Fig. 3 is a horizontal section taken on dotted line 3—3, Fig. 1.

Referring to the drawings, A represents a pipe leading from a suitable chocolate tank X to a chamber or hopper B, which latter is of an inverted rectangular box shape the longitudinal edges $a$, $a$, of which are flanged outward and connected by bolts or otherwise to the corresponding flanges $b$ of the upper edges of a rectangular casing C of a rotary gang pump.

This casing has a horizontal shaft D journaled in its ends, the axis of which is parallel to the longitudinal vertical plane intersecting the center of width of the same, and said casing is also provided with another longitudinally disposed shaft E the ends of which are journaled in the ends of the casing and the axis of which is parallel to that of shaft D and is located the same distance from the center of width of the casing as shaft D. The end of one of these shafts extends beyond its bearings and is provided with suitable means through the medium of which it is driven. Between their bearings these shafts are each provided with a series of corresponding cog-wheels $d$, $d$, and $e$, $e$, respectively. There are, preferably, four of these cog-wheels on each shaft and they are separated a distance corresponding to about their own widths by cylindrical spacing collars $f$ and $g$, the circumference of which is such that the collars on one shaft contact with the collars on the other shaft midway between the axes of the same. The cog-wheels on one shaft mesh with those on the other, and the chamber in which these wheels $d$ and $e$ and collars $f$ and $g$ revolve correspond in transverse contours to the perimeter of the same except at the top, where it is open to and communicates with the interior of hopper B.

The pump chamber has discharge pipes F leading down from the bottom of the same, from a point midway between the sides of the casing and below each pair of engaging cog-wheels. The lower ends of these discharge pipes are bent laterally to form elbows the lower ends of which are flanged and connected to pipes G, which latter lead to and discharge into T-couplings $h$, one branch $n$ of which extends downward and has a valve N therein, and said branches have flexible pipes H of rubber or other suitable material attached to their lower ends. These pipes H are, preferably, from two to three feet in length and have nozzles I inserted in their lower ends. Another section K of pipe is screwed into coupling $h$ in alinement with pipes F, and this pipe K has a valve-casing J mounted thereon that is provided with a lateral stub $j$, the bore of which is engaged by a screw-valve $k$ whose outer end is provided with a head $m$ and whose inner rounded end penetrates through a suitable opening in pipe K into the bore thereof and is adapted to control the flow of liquid chocolate or bon bon coating past the same through pipe M into a pipe T which connects with and discharges into tank X.

The rotary gang pump, above described, is located above one or more longitudinally movable conveyers or aprons O of the machine, and when operating my improvements to the full capacity thereof, two operators are seated on each side of the machine and each grasps one of the nozzles of the stringing tubes and marks or ornaments the chocolate creams or other confections as they are slowly carried past them on the conveyer.

The liquid chocolate or coating is fed from the tank into hopper B, and is forced at an equal pressure by the rotary cog-wheel pumps, into and out of discharge-pipes F. If valves N in branches $n$ of T-coupling $h$ are opened, and valves $k$ closed or partially closed the liquid chocolate or other coating will be forced down through the flexible stringer tubes and out of the nozzle in just the quantity desired and there will be no waste as when stringing is done by hand.

What I claim as new is:—

1. In a machine of the kind specified, the combination with a series of rotary pumps, a corresponding number of flexible tubes having disconnected mobile lower ends from which the liquid coating for confections expelled from said pumps is discharged, and a carrier for coated confections adjacent to and within the reach of the discharge end of said tubes.

2. In a machine of the kind specified, the combination with two series of rotary pumps whose axes are parallel, a corresponding number of flexible tubes having free mobile lower ends from which the liquid coating for confections expelled from said pumps is discharged, and a carrier for coated confections adjacent and within the reach of the discharge end of said tubes.

3. In a machine of the kind specified, the combination with two series of rotary pumps whose axes are parallel, a common hopper therefor, a corresponding number of flexible tubes having free mobile lower ends from which the liquid coating for confections expelled from said pumps is discharged, and a carrier for coated confections adjacent and within the reach of the discharge end of said tubes.

4. In a machine of the kind specified, the combination with two series of rotary pumps consisting of intermeshing cog-wheels, a common chamber in which the same revolve, pipes having free mobile lower ends leading from said chamber from which the liquid confection expelled by said pumps is discharged, and valve-controlled flexible tubes leading from said discharge-pipes.

5. In a machine of the kind specified, the combination with two series of rotary pumps consisting of intermeshing cog-wheels, a common chamber in which the same revolve, a common hopper therefor, pipes leading from said chamber having free mobile lower ends from which the liquid confection expelled by said pumps is discharged, and valve-controlled flexible tubes leading from said discharge pipes.

6. In a machine of the kind specified, the combination with a suitable pump casing, parallel shafts journaled therein, a series of cog-wheels journaled on each of said shafts in such position that the cog-wheels on one shaft mesh with the cog-wheels occupying similar positions on the other shaft, a discharge pipe leading from the pump-chamber under each intermeshing pair of cog-wheels and having mobile lower ends, and valve controlled flexible pipes leading from said discharge pipes.

7. In a machine of the kind specified, the combination with a suitable pump-casing, parallel shafts journaled therein, a series of cog-wheels journaled on each of said shafts in such position that the cog-wheels on one shaft mesh with the cog-wheels occupying similar positions on the other shaft, cylindrical spacing washers mounted on said shafts between said cog-wheels, a discharge pipe leading from the pump-chamber under each intermeshing pair of cog-wheels and having free mobile lower ends, and valve controlled flexible pipes leading from said discharge pipes.

In witness whereof I have hereunto set my hand this 15th day of March, 1917.

HERMAN G. DOELLINGER.

Witnesses:
ROBERT N. BANNETTLER,
FRANK D. THOMASON.